US012810099B2

(12) United States Patent
Cooley et al.

(10) Patent No.: US 12,810,099 B2
(45) Date of Patent: Nov. 24, 2026

(54) CODES FOR SHARING ALIASED EMAIL ADDRESSES

(71) Applicant: Google LLC, Mountain View, CA (US)

(72) Inventors: Aaron Ferguson Cooley, Oakland, CA (US); Emanuel Adhanom, San Carlos, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/961,827

(22) Filed: Nov. 27, 2024

(65) Prior Publication Data

US 2026/0148029 A1 May 28, 2026

(51) Int. Cl.
*G06K 19/06* (2006.01)

(52) U.S. Cl.
CPC .............................. *G06K 19/06037* (2013.01)

(58) Field of Classification Search
CPC ............ G06K 19/06037; G06K 7/1417; G06F 16/955; G06F 16/9554
See application file for complete search history.

(56) References Cited

U.S. PATENT DOCUMENTS 8,949,325 B1 * 2/2015 Hernacki ................. H04L 9/32 709/204
2003/0200334 A1 * 10/2003 Grynberg ................ H04L 51/48 709/206
2013/0146655 A1 * 6/2013 Gandhi ............... H04L 63/0407 235/375
2020/0193111 A1 * 6/2020 Papazian ................ G06Q 30/01
2021/0097124 A1 * 4/2021 Singh .................. G06F 16/9554
2023/0206267 A1 * 6/2023 Doumar ................. G06Q 10/10

OTHER PUBLICATIONS

Features and benefits of the email QR code, ME-QR website, retrieved Mar. 20, 2024, 10 pages.
Personal QR codes on Venmo FAQ, Venmo Help Center, retrieved from internet <https://help.venmo.com/hc/en-us/articles/115010772908-Personal-QR-codes-on-Venmo-FAQ>, Nov. 19, 2024, 5 pages.
QR Code Solutions for Email Communication, ME-QR, retrieved on Mar. 20, 2024, 7 pages.
QR Codes for email addresses, Online Generator, QRStuff website, retrieved Mar. 20, 2024, 14 pages.

* cited by examiner

*Primary Examiner* — Laura A Gudorf
(74) *Attorney, Agent, or Firm* — Botos Churchill IP Law

(57) ABSTRACT

The technology enables efficient and effective real-time sharing of contact information, for instance email addresses, with other people. A machine-readable code, such as a QR code, is associated with a specific email address, which may be an alias of an actual email address of a person. The aliased email address and machine-readable code may be associated with selected contact information, which can automatically be presented to another person who scans the machine-readable code with their device. For example, capture of the machine-readable code may enable an email template to be presented that is prepopulated with at least the aliased email address and/or the selected contact information, or the capture may enable a web link to be presented to the person, so that that person can view the selected contact information.

21 Claims, 12 Drawing Sheets

700

100

120

210

200

300

500

CODES FOR SHARING ALIASED EMAIL ADDRESSES

BACKGROUND

Email addresses can be difficult to communicate verbally in-person. Communication may be particularly challenging in a noisy environment such as at social gatherings, sporting events, breakout sessions for meetings with many attendees, etc. In many situations, there is no business card or other physical media to hand to the other person. The problem can be compounded when the email address has been newly generated and is thus new to both parties involved, or is long or complex. A person might try to exchange their email information by handing their mobile phone or other communication device to the other party; however, this can raise concerns by providing access to unlocked devices.

BRIEF SUMMARY

Aspects of the technology provide methods and systems that efficiently and effectively share contact information, including email addresses, with other people. This involves generating a quick-response (QR) code or other machine-readable code that is associated with a specific email address. The specific email address may be an alias of an actual email address of a particular person. Using an aliased address instead of the actual email address can promote privacy and security. Moreover, the aliased address and machine-readable code can be associated with additional contact information, such as the person's name, phone number, title, business details, etc.

Because the specific email address may be generated as needed (e.g., on-the-fly in real time, or in advance of an upcoming event), and may contain an automatically generated sequence of numbers, letters and/or other characters, it may be challenging for the person to communicate it to someone else. Thus, the QR code or other machine-readable code can be automatically generated, so that when it is scanned by another person's device, the specific email address and additional contact information may be presented or used to populate an email template.

According to one aspect of the technology, a method comprises: generating, by one or more processors, an aliased email address that is associated with an actual email address of a user but is uncorrelated from the actual email address; generating, by one or more processors, a machine-readable code corresponding to the aliased email address and a set of profile information associated with the user, the machine-readable code configured for display by a client computing device associated with the user and configured for capture by another computer device associated with another person; wherein capture of the machine-readable code by the other computing device either: enables an email template to be presented to the other person on the other computing device, the email template being prepopulated with at least the aliased email address; or enables a web link to be presented to the other person on the other computing device, the web link being prepopulated with at least a portion of the set of profile information.

In one example, the machine-readable code is generated in response to generating the aliased email address. In another example, the aliased email address is generated in response to a user request so that the machine-readable code can be captured by the other computing device. 4. The machine-readable code may be a quick-response (QR) code configured to be captured by an imaging element of the other computing device. The set of profile information may include at least one of a contact card, messaging options, or cryptographic key information. The email template may be further prepopulated with at least a portion of the set of profile information.

The set of profile information may be determined based on a set of parameters. In this case, the set of profile information may be subject to either a temporal restriction or a geographic restriction.

The machine-readable code may be generated by the client computing device. Here, the aliased email address may also be generated by the client computing device. Alternatively, the aliased email address may be generated by a remote messaging system.

According to another aspect of the technology, a system is provided that comprises one or more processors. The one or more processors implement a communication alias module that is configured to generate an aliased email address that is associated with an actual email address of a user but is uncorrelated from the actual email address. The one or more processors further implement a machine-readable code module configured to generate a machine-readable code corresponding to the aliased email address and a set of profile information associated with the user. The machine-readable code is configured for display by a client computing device associated with the user and configured for capture by another computer device associated with another person. Capture of the machine-readable code by the other computing device either enables an email template to be presented to the other person on the other computing device, or enables a web link to be presented to the other person on the other computing device. The email template is prepopulated with at least the aliased email address. The web link being is with at least a portion of the set of profile information.

The machine-readable code may be generated in response to generating the aliased email address. Alternatively or additionally, the aliased email address may be generated in response to a user request so that the machine-readable code can be captured by the other computing device. The machine-readable code may be a quick-response (QR) code configured to be captured by an imaging element of the other computing device. The set of profile information may include at least one of a contact card, messaging options, or cryptographic key information. Alternatively or additionally, the set of profile information may be determined based on a set of parameters. In any of the above alternatives and examples, the email template may be further prepopulated with at least a portion of the set of profile information.

In one scenario, the client computing device is the system. In another scenario, the system is a remote messaging system as described herein.

DETAILED DESCRIPTION

Figure 1A:
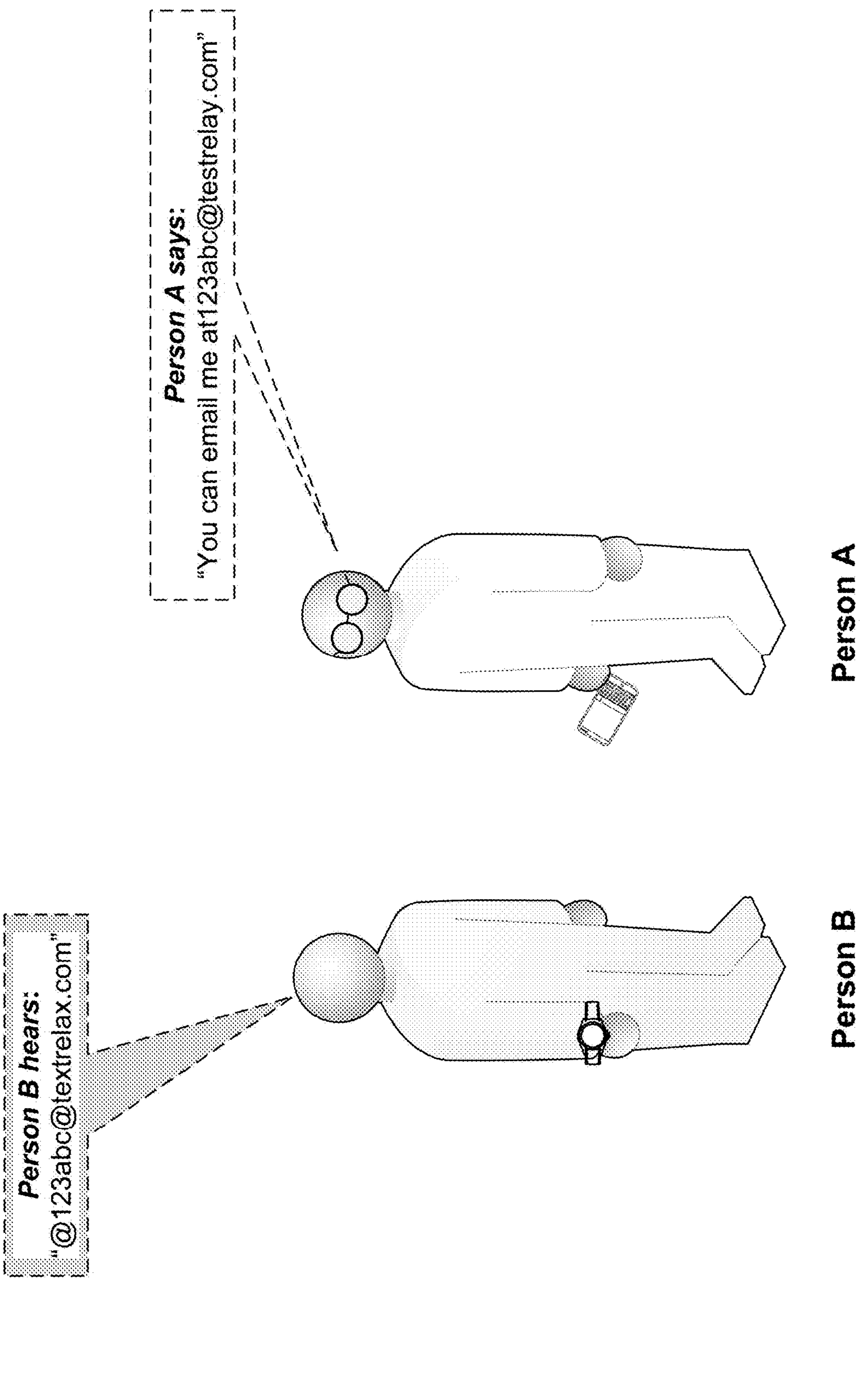
FIGS. 1A-B illustrate example scenarios in accordance with aspects of the technology.

FIG. 1A illustrates an example in-person situation 100 in which one person (here, person "A") is engaged in conversation with another person (here, person "B"). Person A desires to communicate an email address to person B. In this situation, person A is trying to communicate their email address to person B verbally during their conversation. However, as noted above, it can be challenging to properly communicate such information, especially in a noisy environment. It can also be challenging to provide the email address when that email address has been newly generated and/or is an alias of person A's actual email address. Here, as shown in FIG. 1A, person A may say: "You can email me at123abc@testrelay.com". However, what person B hears (or incorrectly enters into their personal communication device, such as a mobile phone or smart watch) is: "@123abc@textrelax.com".

Figure 1B:
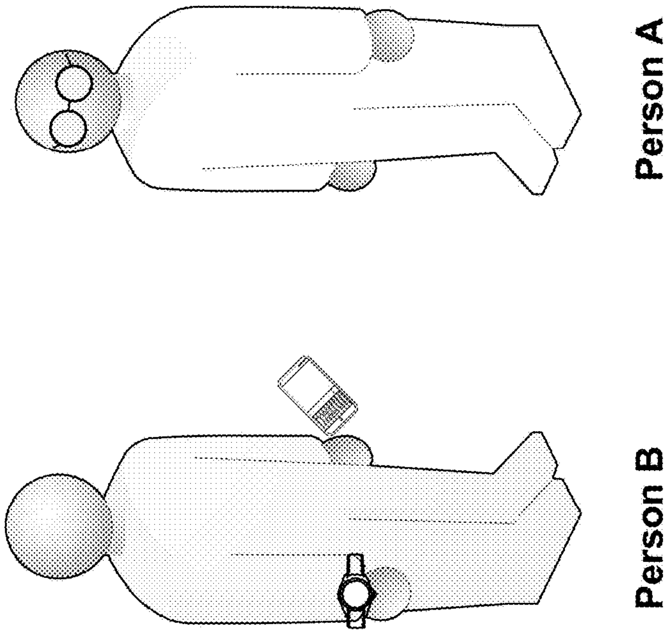

One way to avoid verbal miscommunication in this type of in-person situation is for person A to hand their communication device (e.g., a mobile phone or other portable communication device) over to person B, as shown in situation 120 of FIG. 1B. In this situation, person A has unlocked their phone in order to show person B the email address. Unfortunately, giving the other person the device or unlocking the device in their presence may increase the risk of improper access to content on the device or malicious use of the device.

A more effective and secure way of exchanging contact information is to visually present a QR code or other type of machine-readable code (e.g., a bar code or binary code) that is detectable by an image sensor of a personal communication device. This machine-readable code corresponds to an actual email address or aliased version of the actual email address. Scanning or otherwise capturing the machine-readable code by the personal communication device can trigger an email or access a web link prepopulated with information including the desired email address. This is explained in detail below.

Exemplary Configurations and Approaches

Figure 2A:
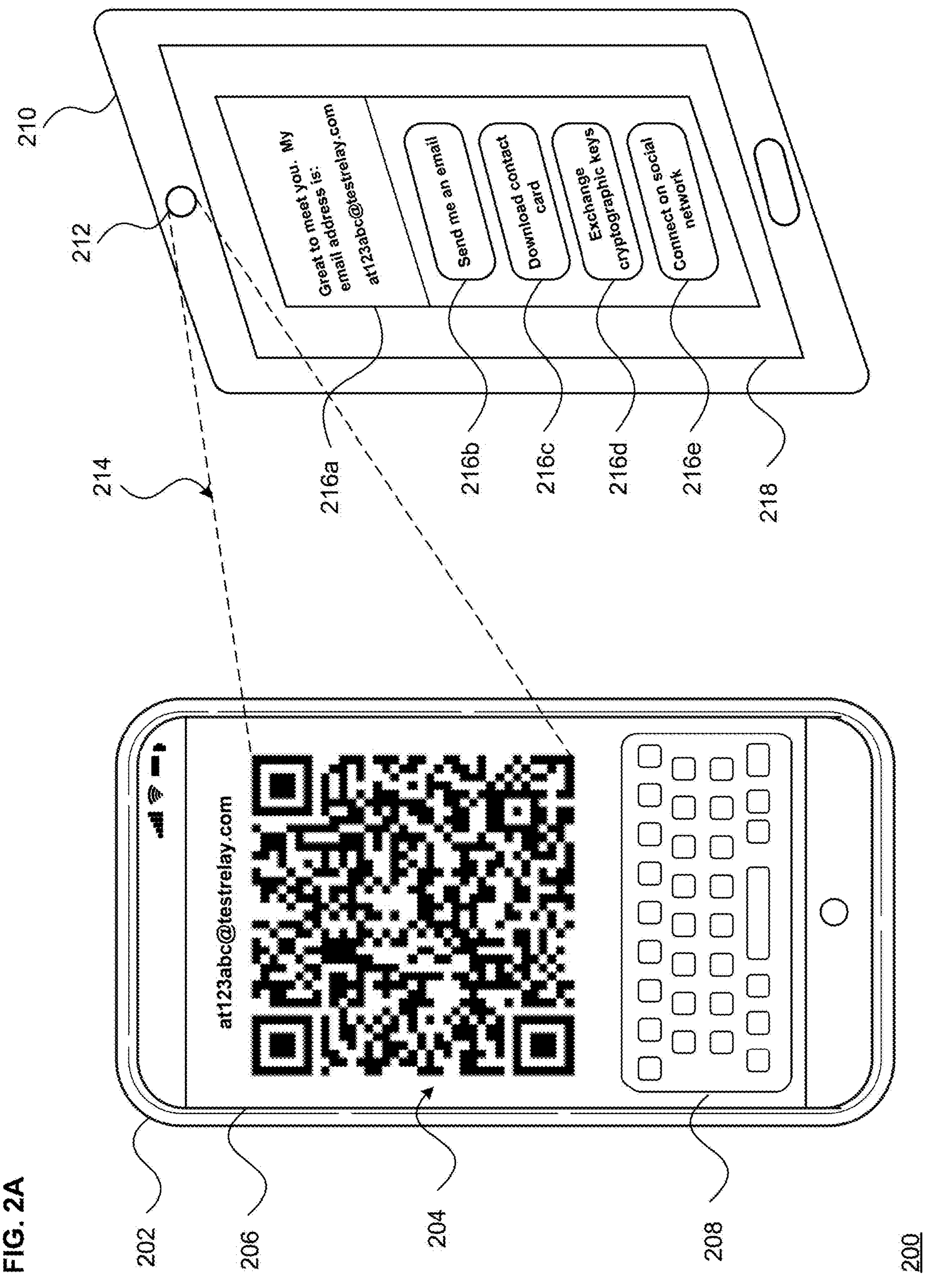
FIGS. 2A-B illustrate an example scenario in accordance with aspects of the technology.
Figure 2B:
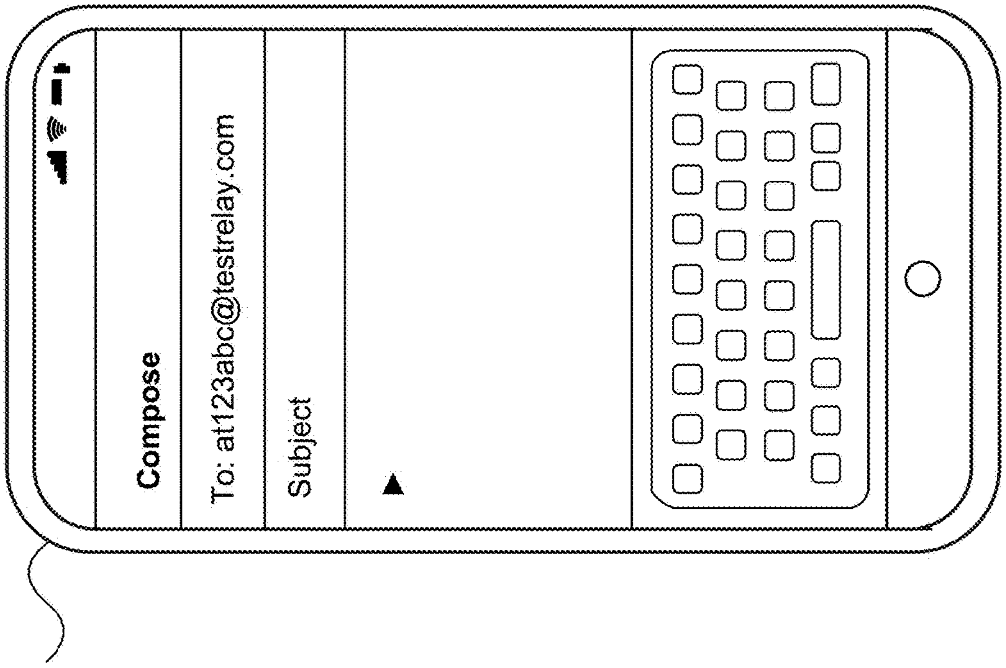

FIG. 2A illustrates an example scenario 200, where communication device 202 of person A presents a QR-type code 204 on a graphical user interface (GUI) or display 206 of the device 202. As shown, the GUI (or the device itself) may include a keyboard 208 or other user input element. In this example scenario, communication device 210 of person B includes a camera 212 or other imaging element. Here, as shown by dashed lines 214, the camera 212 is able to scan or otherwise capture the QR-type code 204 from the display 206. Once scanned, in one configuration the code can provide information to the recipient identifying the email address, such as shown in section 216*a* of the GUI/display 218. It can also include a mail or web link as shown in section 216*b*, in order to send an email to the email address. This can be done using any email client either resident on the device 210 or via a back-end app that is managed by a remote system. The email client may support any suitable email protocol(s), such as Simple Mail Transfer Protocol (SMTP), Internet Message Access Protocol (IMAP), Post Office Protocol version 3(POP 3 ), HyperText Transfer Protocol (HTTP), etc. FIG. 2B illustrates one example of an email client that can be used by person B to send an email to the actual or aliased address of person A. As shown, the email address obtained from the code 204 ("at123abc@testrelay.com") is automatically prepopulated in the "To" line of the email message template. Alternatively or additionally, other communication link options may be presented to the user as shown in FIG. 2A. For instance, as shown in section 216*c*, the link could be to download a contact card, in section 216*d* the link could be to exchange cryptographic keys between the parties, in section 217*e* the link could be to connect to the other person on a social network, etc.

Figure 2C:
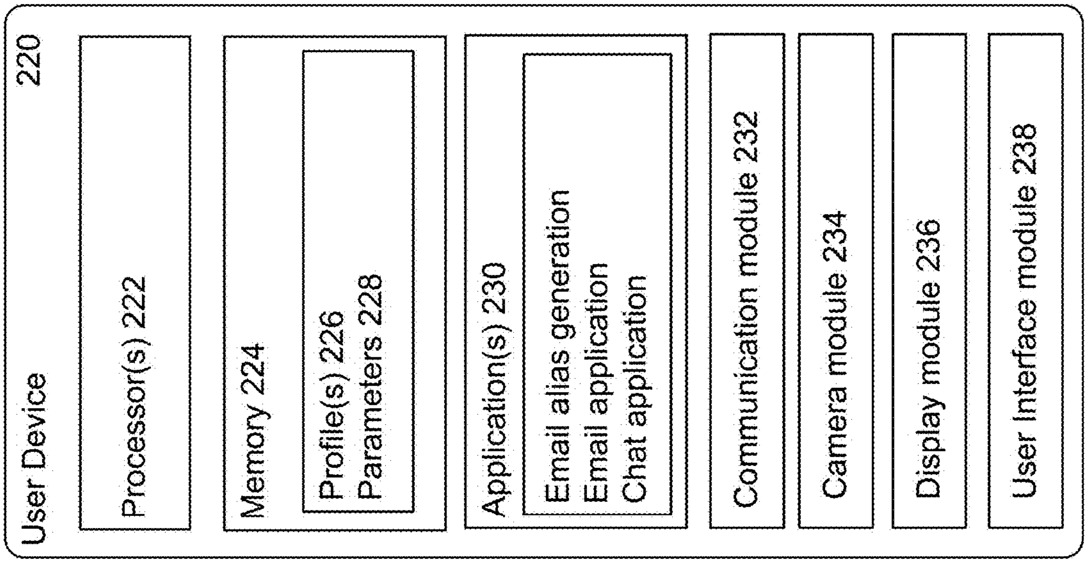
FIG. 2C illustrates an example user device in accordance with aspects of the technology.

FIG. 2C illustrates an example 220 of either user device 202 or user device 210. In this example, the user device includes one or more processors 222 and memory 224. The memory 224 is configured to store profile information 226 and/or a set of parameters 228. The profile information 226 and/or the set of parameters 228 can be used when generating the machine-readable code. For instance, the profile information 226 may correspond to one or more email aliases, and may point to a universal resource locator (URL) address that will be opened in a browser of device 210 when the code is scanned from the device 202. The profile information may include information about the person sharing the code, such as a contact card with their name and phone number, their chat, instant messaging and/or social networking details (e.g., messaging options), their title and/or other business-related information, cryptographic key information that can be exchanged between the parties etc. In this scenario, the set of parameters 228 may be selectable by person A so that certain information will be presented to person B once the code has been scanned and the URL opens in the user device for that person. In one example, the set of parameters may indicate which elements of the profile information are to be presented to the person that scans/accesses the machine-readable code. For instance, certain elements of the profile information may be enabled (or disabled) for presentation to the person based on a temporal (time) restriction, geographic restriction (e.g., based on the location of the person's device or the location where the code was scanned, and/or other criteria.

As shown, the user device 220 also includes one or more applications 230 (e.g., an email alias generation app, a chat app, an email app, etc.), a communication module 232 (e.g., to communicate with a remote server and/or other user devices), a camera module 234 configured to capture imagery including machine-readable codes, a display module 236 configured to generate the GUI including an email template based on information from the QR code or an associated URL, and a user interface (UI) module 238 configured to receive user input and to cause information to be presented via the display module.

In some situations, it may be desirable to share an aliased email address rather than the actual email address of a given user. Aliased addresses can be quickly generated using a word and a string of numbers, or some other aliased configuration. This configuration may be completely uncorrelated from the actual email address of the user. Generation may be done on the fly in real time, or at any time before the aliased address is to be shared. Because aliased addressed can be generated quickly and they contain an unfamiliar sequence, e.g., of random numbers, letters and/or special characters, it can be hard to communicate this new address to another person. Combine this with a noisy environment, or a disability such as dyslexia or a hearing impairment, and one can understand how hard it may be for a user to use an aliased email address to maintain the privacy of their actual email address while telling other people that they want to communicate with the aliased address.

Aliased addresses may be temporary or permanent email addresses. For instance, a temporary aliased address may be usable for a limited number of interactions (e.g., 1-5 emails with another person) or for a limited time (e.g., today only, for the next 3 days, etc.). A permanent aliased email address may be employed by the user for interactions with one or more other people, businesses or other entities without a time or interaction constraint.

While FIG. 2C indicates that an email alias app may be resident on the person's computing device, in an alternative the email alias generation may be performed by a back-end system. In either approach, the generation results in an alias that is not coupled to the actual email address, although the system can forward correspondence sent to the alias to the actual address.

Figure 3:
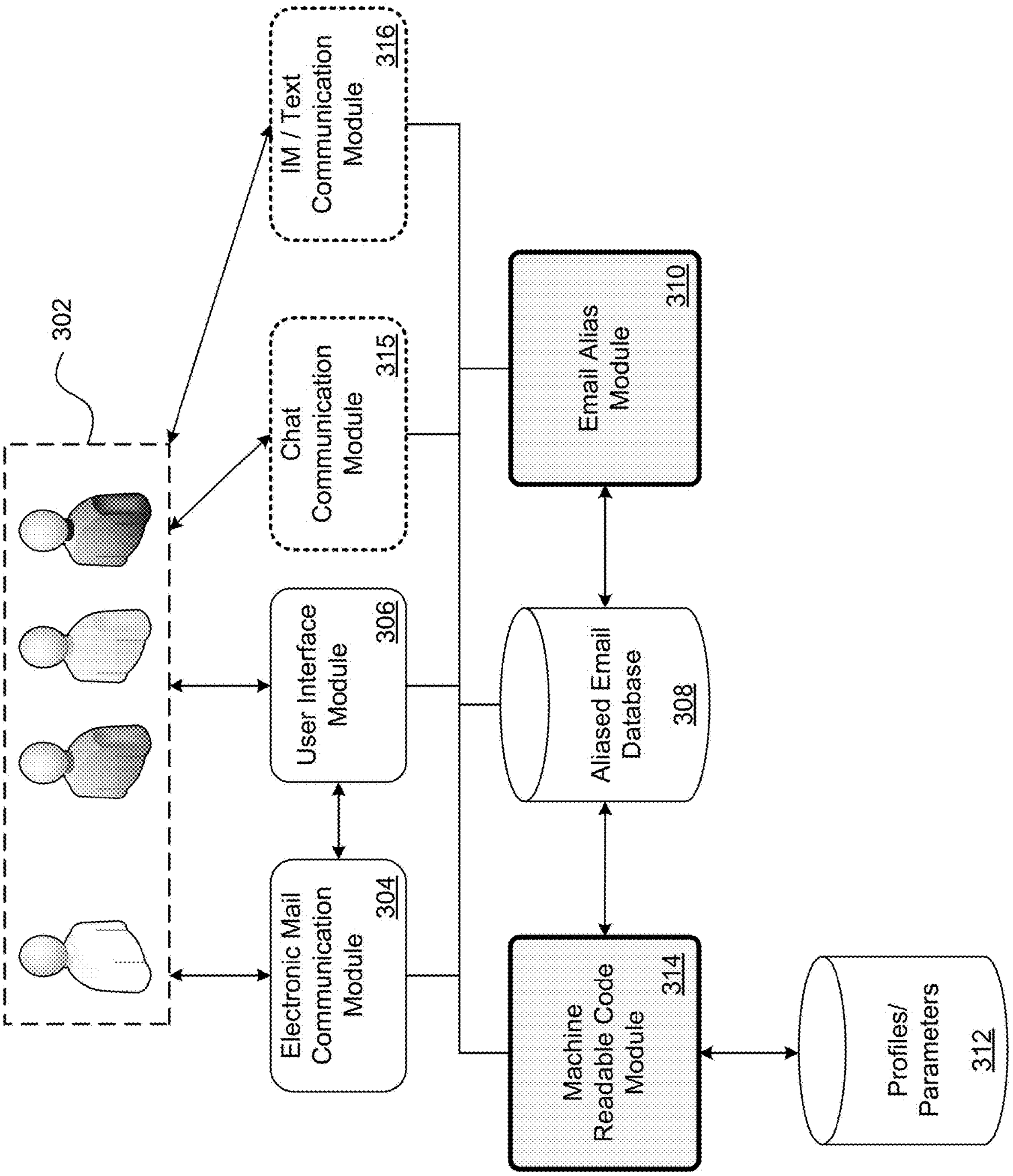
FIG. 3 illustrates an example system in accordance with aspects of the technology.

FIG. 3 illustrates a system example 300 that implements various aspects of the technology. As shown in this example, there are a number of users 302 that can interact with one or more modules of the system. While four users 302 are illustrated, any number of users may interact with the system, either to set up and use an aliased email address and/or to correspond with someone who is using an aliased email address via a link from a QR or other machine-readable code. The interactive modules in this example include an electronic mail communication module 304 and a user interface module 306. The user interface module 306 may be configured to interact with users, e.g., directly or via the mail module 304 and the user's computing device. This may be done in order to provide a QR code or other machine-readable code and/or to provide a messaging interface. Alternatively, the mail module 304 may have a user interface module incorporate therein that is configured to interact with the user, without the need for a separate user interface module 306.

In other examples, other communication approaches may be used in addition or in alternative to email communication. For instance, as shown in FIG. 3, there may be a chat communication module 315 and/or an instant message (IM) or text communication module 316 for different messaging options. These modules may manage communication in an equivalent manner to that of the electronic mail communication module as described herein. Here, in one scenario, an email alias module 310 may be configured to generate aliased addresses for these alternative forms of communication.

As shown, there may be several databases used by the system. Aliased email database 308 may be used by the system to store and manage aliased email addresses (or other addresses). This may be a secure relational database that associates a given aliased (email) address to an actual (email) address. As noted above, the characters of the aliased email address may be completely uncorrelated from the actual email address of the user (e.g., have no overlap or relation to the characters of the user's actual email address).

Email addresses comprise a first (local) part, and a second (domain) part, separated by a fixed symbol (here, the "@" symbol). The aliased email address, in this scenario, is generated by email alias module 310. For instance, when a user requests generation of an aliased email address, they may provide their actual email address (e.g., xenawp@nomail.com"). The email alias module 310 may first check the aliased email database 308 to determine whether there is already an aliased email address associated with the user's email address. If so, no new alias is created. If not, then the module 310 generates a new aliased email address (e.g., at123abc@testrelay.com).

In one example, the generation by the system may request certain information from the user, such as how many characters to include in the local part (e.g., should there be at least 6 characters, between 5 -15 characters, no more than 20 characters, etc.). The interface may enable the user to select which characters to include (e.g., "MyBizIsTheBest") in the local part and/or which character to not include in the local part (e.g., do not include the number 13 or the letter "x").

In another example, the generation may involve the module selecting the number of characters to include in the local part. The generation may also involve one or more of the following: ensuring that no character in the aliased address is the same as any character in the actual address, ensuring that there is a minimum number of letters, numbers, uppercase, lowercase, and/or special characters in the aliased address. The generation may also include selecting a domain for the email alias. For instance, while "testrelay.com" is the domain in the above example, the module 310 may create or select the domain from a set of alias domains (e.g., testrelay. com, testrelay1.com, testrelay2.com, etc.).

As explained above with regard to FIG. 2C, there may be profile information and/or parameters that can be used in conjunction with the machine-readable code. Thus, as shown in FIG. 3, there may be a profile/parameter database 312.

The database 312 may store user-related information, such as their name, phone number, chat or instant messaging details, title and/or other business-related information, etc. The other business-related information may include specific details about the business, such as operating hours, location(s), etc. It may also include templates and/or prepopulated message elements for email engagements. By way of example, this may include something such as: "Hi, nice to meet you", where this template can be used to prepopulate an email message once someone scans in a QR code provided by the user. The database 312 may include various alternatives from which the user may select. In one example, this may include links to materials about a specific product, such as user brochures, white papers, peer-reviewed articles, technical service bulletins, sales brochures, etc. Alternatively or additionally, the database 312 may include options that can be automatically selected in response to a set of criteria, such as a location at which the code was scanned, a time of day or day of the week, etc.

Machine-readable code module 314, as shown, is operatively coupled to the databases 308 and 312. In one scenario, the module 314 is configured to receive a user request to generate a QR-type code or other machine-readable code. The code is generated based on a given email address (such as one aliased email address from the aliased email database 308) and information from the profiles/parameters database 312. Thus, the code either incorporates or otherwise represents the email address and other information. The information may be specific information selected by the user when requesting generation of the code. Or it may be a baseline set of information used with any request corresponding to a given email address.

The module 314 generates a visually perceptible code that can be scanned, imaged or otherwise captured by an imaging device. This code, once captured, is used to launch a web page with a link that lets the person who captured it with their device to compose a message to the associated email address, such as shown in FIG. 2A.

Figure 4A:
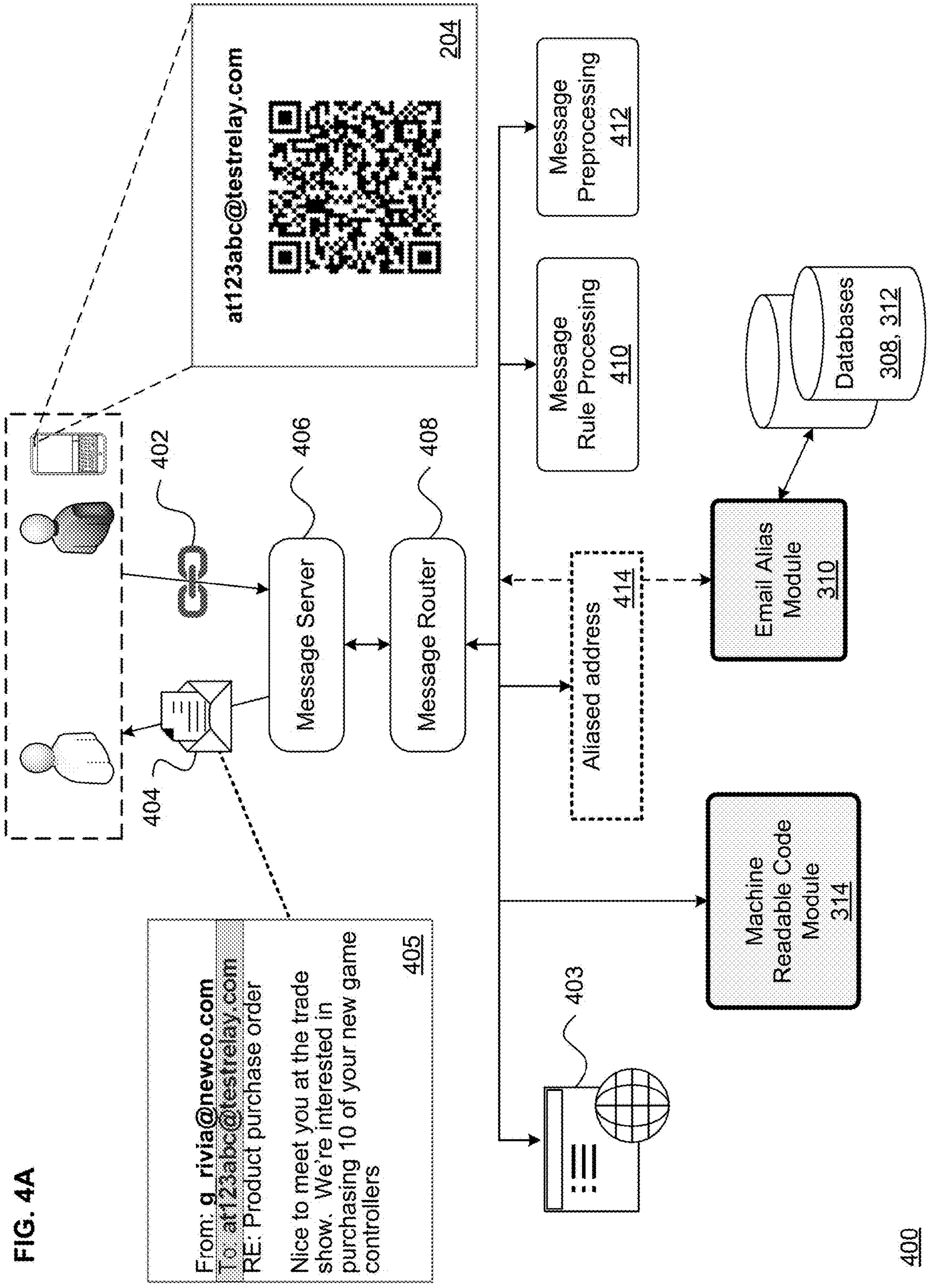
FIGS. 4A-B illustrate other example systems in accordance with aspects of the technology.

Alternative configurations are possible, and are within the scope of the present technology. For instance, FIG. 4A illustrates an alternative example 400 of a system architecture. In this example, a first person has scanned a machine-readable code (here, a QR code 204 as illustrated in FIG. 2A) from the device of another person. Link 402 obtained from the code may provide access to a webpage or other site 403, through which the first person can message the other person. In this configuration, incoming messages or other information (such as link 402) and outgoing messages 404 (such as email 405) pass through an electronic messaging system. In particular, incoming information enters the system from the outside world (e.g., sent from one or more users) via a messaging server 406. The messaging server 406 may be, by way of example, a simple mail transfer protocol (SMTP) server, although other types of messaging servers may be employed.

The messaging server 406 is, in this scenario, the interface to the outside world (e.g., to the users). It passes incoming messages to a message router 408, and outgoing messages from the message router to the users. The message router 408 may route a given incoming message 402 to one or more modules, as well as to one or more inboxes. For instance, the link may be routed to the webpage 403, while incoming email messages may be routed to a message rule processing module 410 and/or, a message preprocessing module 412.

The message rules processing module 410 can manage one or more rules that indicate to which inboxes or specific people the incoming message will be sent. This may include routing an email sent to an aliased email address 414 to the actual email address, for instance based on linkage information maintained in the aliased email database 308 of FIG. 3.

The preprocessing module 412 may be configured to perform certain operations on incoming messages 402. The operations may include one or more of identifying other people included in either a "cc" or "to" line, removing headers, stripping out a signature line or signature block, deleting quoted text (e.g., prior message segments in an email thread, which may begin with a ">" character or other leading character(s)), discard ambiguous or malformed emails, remove attachments, etc.

Once any of the processing modules (e.g., modules 410 and/or 412) process a given email message, that email message can be sent to the message router 408 for appropriate distribution. As indicated above, the input email messages, or processed versions of those messages, may be routed to one or more inboxes or email addresses (actual or aliased) via the message router 408.

In one example, upon scanning of the QR code or other machine-readable code 204, the corresponding link from that code is used to access webpage 403. This webpage may be prepopulated with information maintained in the profiles/parameters database 312. Thus, as shown in example email 405, this email message may be directed to a given aliased email address ("at123abc@testrelay.com"), and may include the prepopulated text "Nice to meet you at the trade show." The sender's email address can be added (here, "g_rivia@newco.com"), either by the email sender, or that address may be pulled by the system from the message server 406 or the message router 408. The sender can then add any desired information to the message, such as "We're interested in purchasing 10 of your new game controllers". Once composed, the message 405 is routed to the intended recipient, such as via their aliased email address as discussed above.

Figure 4B:
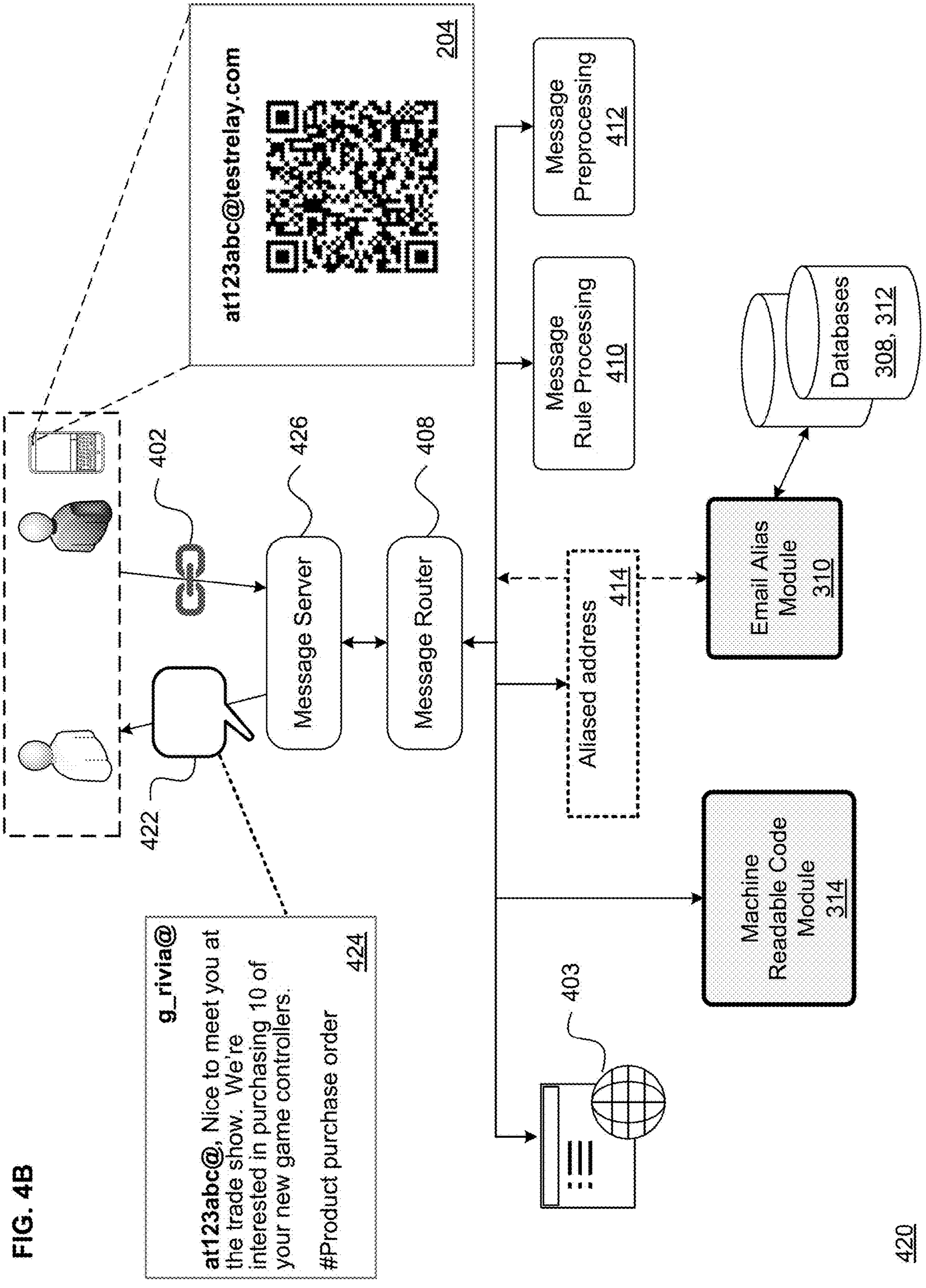

As noted above, other message types may be supported by the system in addition or in the alternative to electronic mail-type messages. For instance, FIG. 4B illustrates another alternative example 420 of a system architecture. In this example, a first person has scanned a machine-readable code (here, a QR code 204 as illustrated in FIG. 2A) from the device of another person. Link 402 obtained from the code may provide access to a webpage or other site 403, through which the first person can message the other person. In this configuration, incoming chat messages, IMs, text messages or other information (such as link 402) and outgoing messages 422 (such as chat or IM 424) pass through an electronic messaging system. In particular, incoming information enters the system from the outside world (e.g., sent from one or more users) via a messaging server 426. The messaging server 406 may, by way of example, be configured to handle processing of chat messages, IMs, texts or the like, although other types of messaging servers may be employed. Thus, in one scenario, the alias module 310 may additionally or alternatively be configured to generate aliased addresses for alternative forms of communication such as IMs, text messages, chat messages, etc. Thus, the alias module 310 may be referred to as a communication alias module.

Other configurations are possible. For instance, in one scenario the QR code or other machine-readable code is generated in response to creation of a new aliased email address. In another scenario, one or both of the aliased email address and/or the machine-readable code can be generated by a user's computing device, rather than a back-end messaging system. In this case, once the aliased email address is created, the information about that address may be send to a back-end messaging system so that the aliased address can be securely linked to the user's actual email address.

In one example, selection of the link from the QR code or other machine-readable code directly launches email (or other electronic message) composer. This composer may offer options such as copying the (aliased) email address or saving it to contacts.

In another example, the webpage (URL) associated with the QR code or other machine-readable code can be populated with whatever information the user wants to share. Thus, the webpage may operate like a function. Depending on what parameters are included, only certain of the user's information on the web page would be shared with the person who scanned in the machine-readable code. The information that is shared may be selected or otherwise obtained from the profiles/parameters database.

In a further example, one could have multiple businesses (or different groups of one business) which all leverage the same set of (aliased) email addresses. In this case, different QR codes or other machine-readable codes can be generated for different aspects of the business to be share. Thus, one code may be used by the sales team, another code used by an engineering team, and a third code used by a support team. The information presentable to the person who scans the code would thus vary accordingly.

Figure 5:
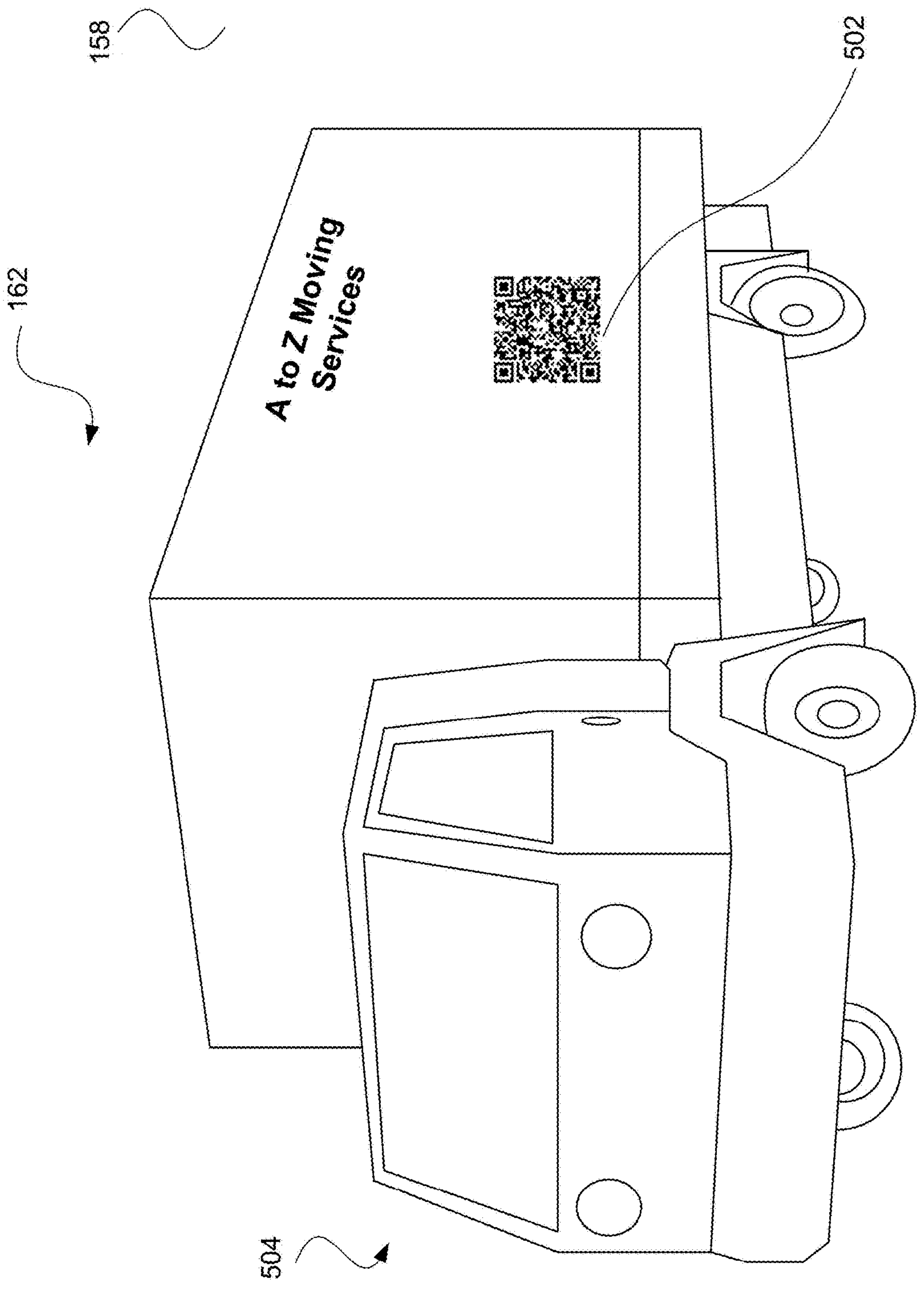
FIG. 5 illustrates an example scenario in accordance with aspects of the technology.

Moreover, while some of the examples discussed herein involve face-to-face verbal communication, that is not required. The shared information may be available on-line, put on side of a vehicle (like business advertising), printed on business cards or other marketing materials, etc. By way of example only, FIG. 5 illustrates a scenario 500 in which a QR code 502 is placed on the side of a panel truck or other vehicle 504. In this scenario, when a person scans in the code 502, a link pops up on the display of their device. When selected, the link may launch a webpage with information about a business (here, A to Z Moving Services). Here, the information could be tailored based on various factors. One such factor may be the location of the vehicle 504, e.g., based on geolocation information in the image that captured the QR code. Another factor may be the time of day or day of the week. Thus, in one arrangement, the QR code may be contact information, which can be one time generated by a user's device. Moreover, the QR code can be specific to some location where it is printed or otherwise displayed. It may even be part of an electronic display that changes over time.

Example Computing System

Figure 6A:
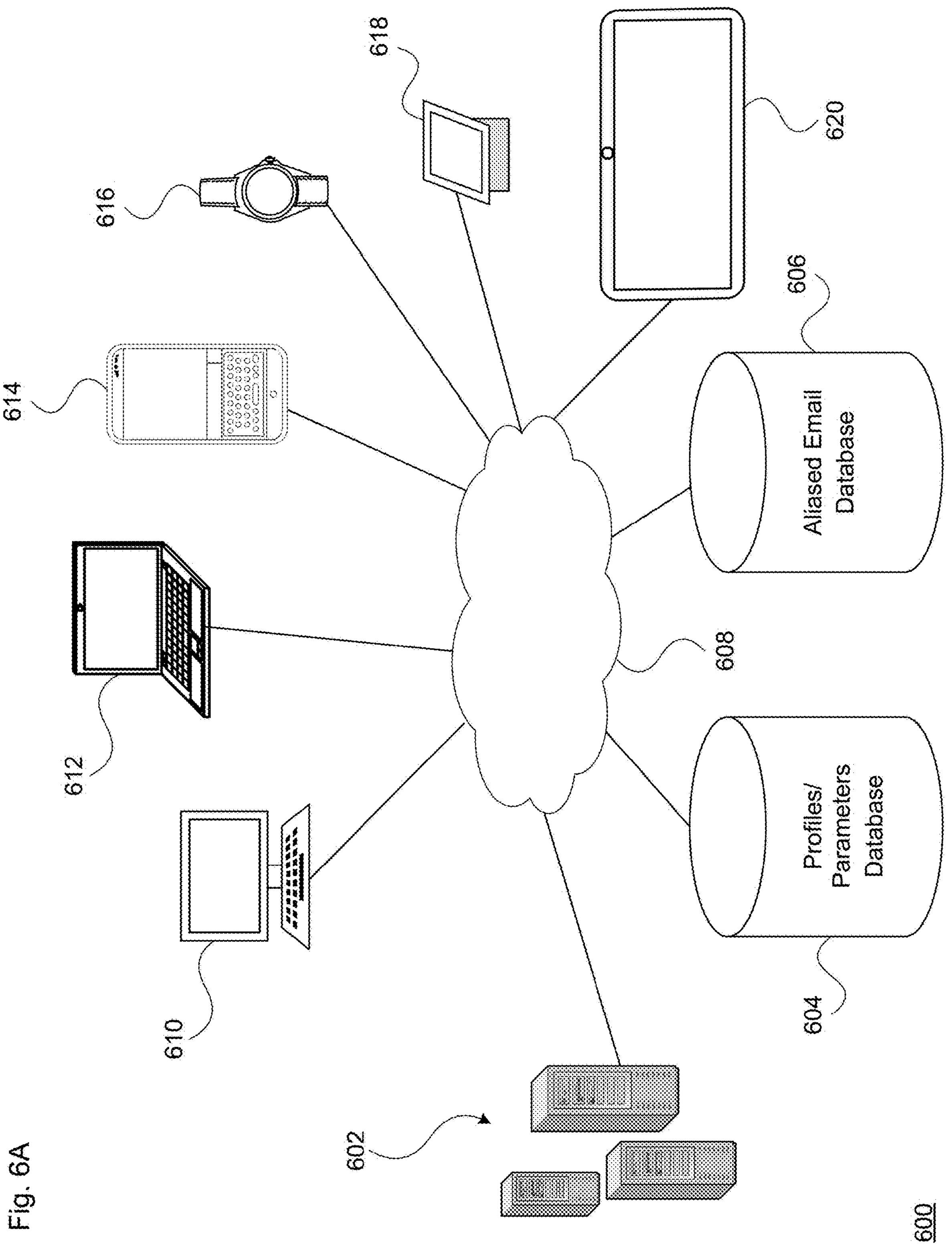
FIGS. 6A-B illustrate a system for use with aspects of the technology.
Figure 6B:
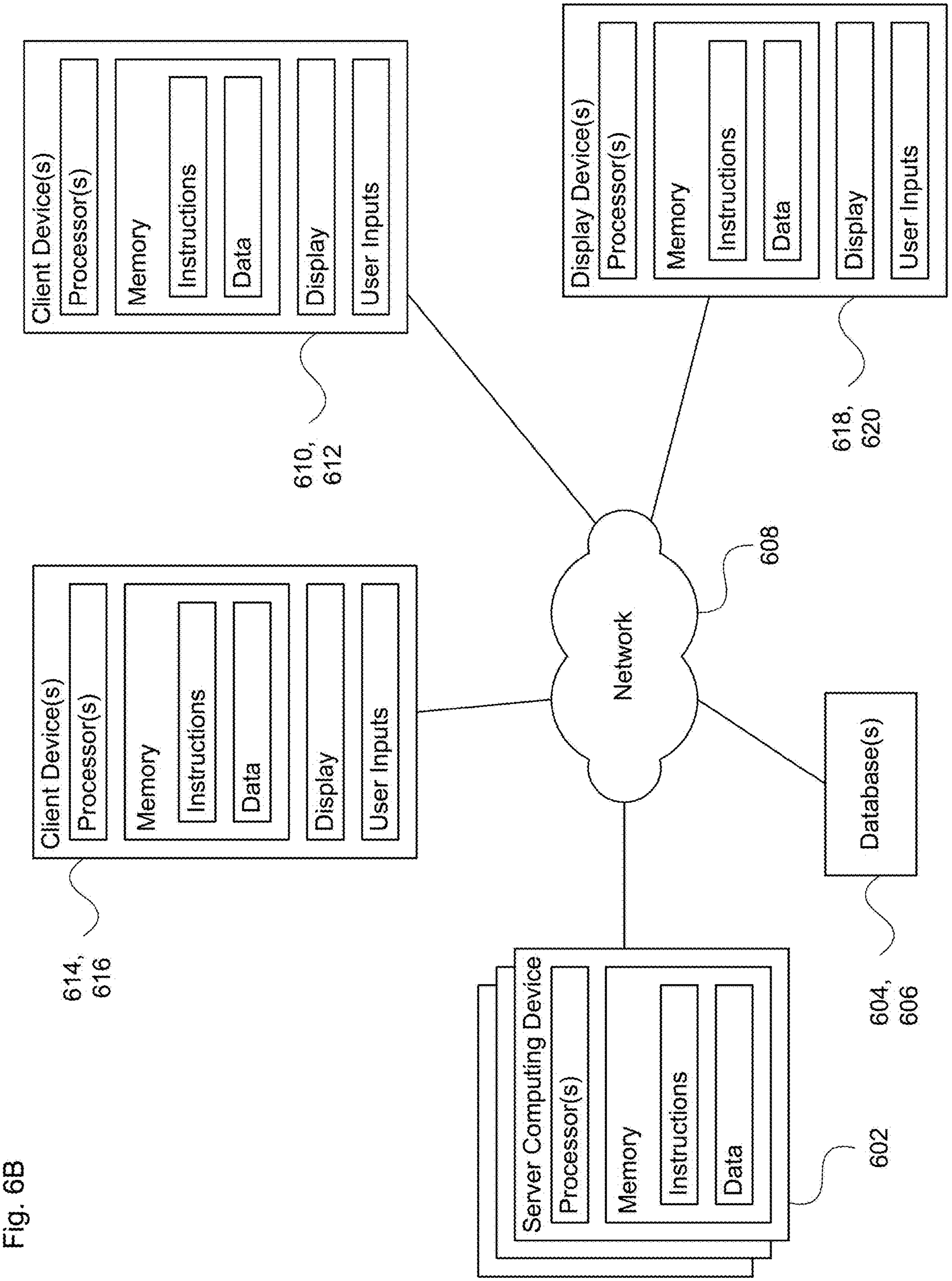

The approaches described herein may be implemented using various types of computing devices and architectures. One example computing architecture is shown in FIGS. 6A and 6B. In particular, FIGS. 6A and 6B are pictorial and functional diagrams, respectively, of an example system 600 that includes a plurality of computing devices and databases connected via a network. The computing device(s) 602 may implement the message server 406, the message router 408, and the modules 310 and 314, as well as databases 308 and 312. The computing devices 602 may comprise on one or more tensor processing units (TPUs), graphics processing units (GPUs), CPUs or other computing architectures.

Databases 604 and 606 may store, e.g., profile and/or preference information, aliased email address information, etc. The server system may access the databases via network 608. Client devices may include one or more of a desktop computer 610, a laptop or tablet PC 612, a mobile phone 614, a wearable device such as a smartwatch 616, etc. Other types of client devices may include a smart display 618 and/or a whiteboard, billboard (e.g., electronic or non-electronic) or other type of display 620.

As shown in FIG. 6B, each of the computing devices 602 and 6110-616 may include one or more processors, memory, data and instructions. The memory stores information accessible by the one or more processors, including instructions and data that may be executed or otherwise used by the processor(s). The memory may be of any type capable of storing information accessible by the processor(s), including a computing device-readable medium. The memory is a non-transitory medium such as a hard-drive, memory card, optical disk, solid-state, etc. Systems may include different combinations of the foregoing, whereby different portions of the instructions and data are stored on different types of media. The instructions may be any set of instructions to be executed directly (such as machine code) or indirectly (such as scripts) by the processor(s). For example, the instructions may be stored as computing device code on the computing device-readable medium. In that regard, the terms "instructions", "modules" and "programs" may be used interchangeably herein. The instructions may be stored in object code format for direct processing by the processor, or in any other computing device language including scripts or collections of independent source code modules that are interpreted on demand or compiled in advance.

The processors may be any conventional processors, such as commercially available CPUs, TPUs, GPUs, etc. Alternatively, each processor may be a dedicated device such as an ASIC or other hardware-based processor. Although FIG. 6B functionally illustrates the processors, memory, and other elements of a given computing device as being within the same block, such devices may actually include multiple processors, computing devices, or memories that may or may not be stored within the same physical housing. Similarly, the memory may be a hard drive or other storage media located in a housing different from that of the processor(s), for instance in a cloud computing system of server 602. Accordingly, references to a processor or computing device will be understood to include references to a collection of processors or computing devices or memories that may or may not operate in parallel.

Reference to "one or more processors" herein includes situations where a set of processors (e.g., two or more CPUs, TPUs, GPUs or any combination thereof) may be configured to perform one or more operations. Any combination of such a set of processors may perform individual operations or a group of operations. Therefore, reference to "one or more processors" does not require that all processors in the set must perform all of the operations. Rather, unless expressly stated, any one (or different combinations) of the one or more processors may perform different operations when a set of operations is indicated. For instance, different processors may perform specific operations. For example, a first processor may perform receiving and routing of incoming and/or outgoing electronic messages, while a second processor performs email alias generation and a third processor performs generation of a QR code or other machine-readable code.

Received data, such as emails, chats, links, etc., may be operated on by the modules, models and processes described herein. The computing devices may utilize such information in various apps or other programs to perform message-related operations. The computing devices may include all of the components normally used in connection with a computing device such as the processor and memory described above as well as a user interface subsystem for receiving input from a user and presenting information to the user (e.g., text, imagery and/or other graphical elements). The user interface subsystem may include one or more user inputs (e.g., at least one front (user) facing camera, a mouse, keyboard, touch screen and/or microphone) and one or more display devices (e.g., a monitor having a screen or any other electrical device that is operable to display information (e.g., text, imagery and/or other graphical elements). Other output devices, such as speaker(s) may also provide information to users.

The user-focused types of computing devices (e.g., 610-620) may communicate with a back-end computing system (e.g., server 602) via one or more networks, such as network 608. The network 612, and intervening nodes, may include various configurations and protocols including short range communication protocols such as Bluetooth™, Bluetooth LE™, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, computing device 602 may include one or more server computing devices having a plurality of computing devices, e.g., a load balanced server farm or cloud computing system, that exchange information with different nodes of a network for the purpose of receiving, processing and transmitting the data to and from other computing devices. For instance, computing device 602 may include one or more server computing devices that are capable of communicating with any of the computing devices 610-620 via the network 608.

Figure 7:
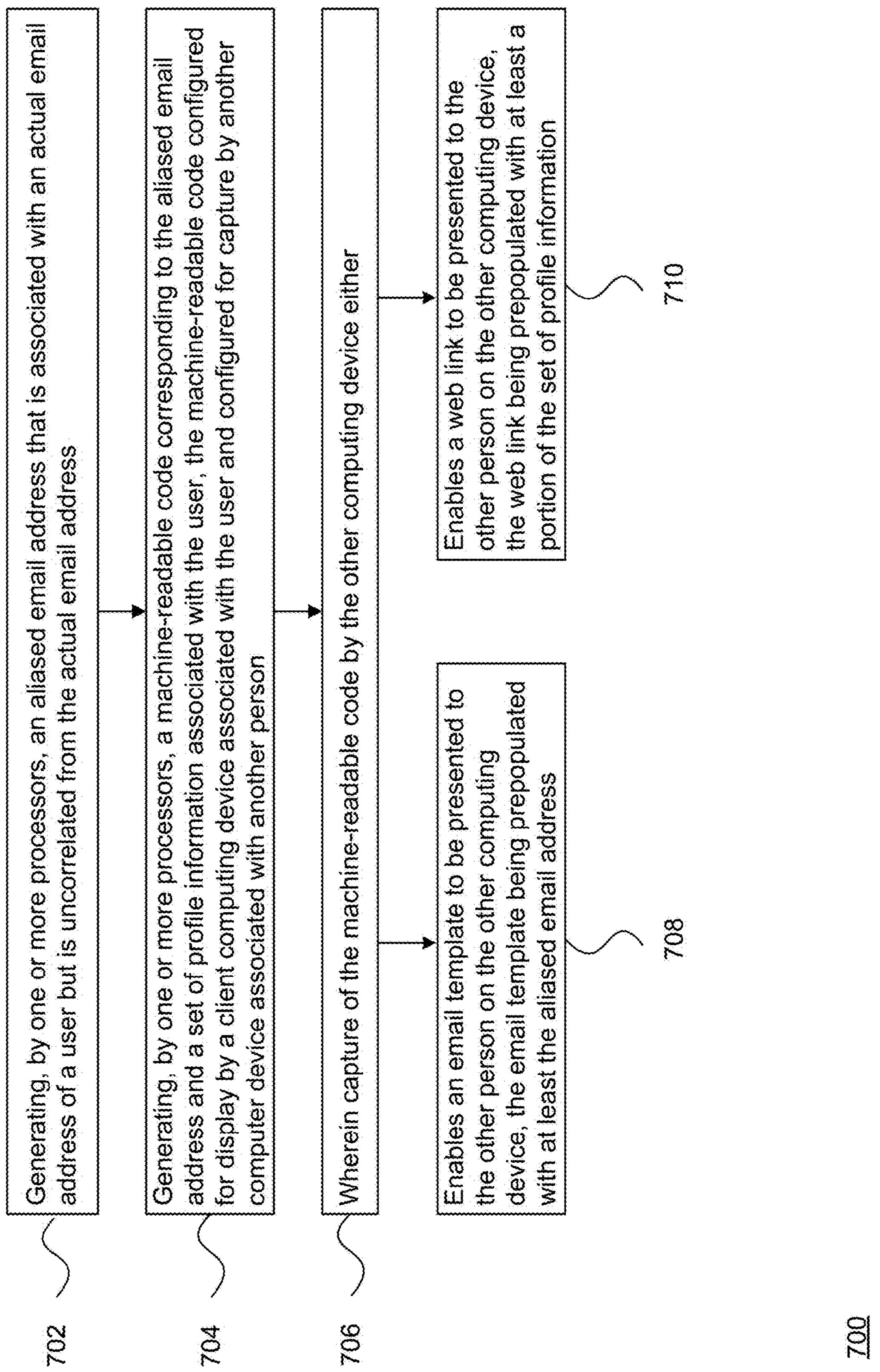
FIG. 7 illustrates a method in accordance with aspects of the technology.

FIG. 7 illustrates a flow chart 700 illustrating an example process according to the approaches discussed herein. As shown at block 702, the process includes generating, by one or more processors, an aliased email address that is associated with an actual email address of a user but is uncorrelated from the actual email address. At block 704, the process also includes generating, by one or more processors, a machine-readable code corresponding to the aliased email address and a set of profile information associated with the user. The machine-readable code is configured for display by a client computing device associated with the user and configured for capture by another computer device associated with another person. As noted at block 706, capture of the machine-readable code by the other computing device may provide one of two possibilities. At block 708, this can enable an email template to be presented to the other person on the other computing device, in which the email template is prepopulated with at least the aliased email address. Or as shown at block 710, this can enable a web link to be presented to the other person on the other computing device, in which the web link is prepopulated with at least a portion of the set of profile information.

Further to the descriptions above, a user may be provided with controls allowing the user to make an election as to both if and when systems, programs, or features described herein may enable collection of user information (e.g., information about a user's email address, chat handle or username, preferences, or current location), and if the user is sent content or communications from a server. In addition, certain data may be treated in one or more ways before it is stored or used, so that personally identifiable information is removed. For example, a user's identity or actual email address may be treated so that no personally identifiable information can be determined for the user, or a user's geographic location may be generalized where location information is obtained (such as to a city, ZIP code, or state level), so that a particular location of a user cannot be determined. Moreover, a user may be provided with controls enabling authorization to use email associated with that user. Thus, the user may have control over what information is collected about the user, how that information is used, and what information is provided to the user or to others.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A method, comprising:

generating, by one or more processors, an aliased email address that is associated with an actual email address of a user but is uncorrelated from the actual email address;

generating, by the one or more processors, a machine-readable code corresponding to the aliased email address and a set of profile information associated with the user, the machine-readable code configured for display by a client computing device associated with the user and configured for capture by another computer device associated with another person;

wherein capture of the machine-readable code by the other computing device either:

enables an email template to be presented to the other person on the other computing device, the email template being prepopulated with at least the aliased email address and at least a portion of the set of profile information; or enables a web link to be presented to the other person on the other computing device, the web link being prepopulated with at least the portion of the set of profile information, wherein the portion of the set of profile information is determined based on a set of parameters, and wherein determination of the portion of the set of profile information includes enabling or disabling one or more elements of the set of profile information based on the set of parameters.

2. The method of claim 1, wherein the machine-readable code is generated in response to generating the aliased email address.

3. The method of claim 1, wherein the aliased email address is generated in response to a user request so that the machine-readable code can be captured by the other computing device.

4. The method of claim 1, wherein the machine-readable code is a quick-response (QR) code configured to be captured by an imaging element of the other computing device.

5. The method of claim 1, wherein the set of profile information includes at least one of a contact card, messaging options, or cryptographic key information.

6. The method of claim 1, wherein the set of parameters includes a temporal restriction.

7. The method of claim 6, wherein the temporal restriction is based on at least one of a time of day or day of a week.

8. The method of claim 1, wherein the machine-readable code is generated by the client computing device.

9. The method of claim 8, wherein the aliased email address is generated by the client computing device.

10. The method of claim 8, wherein the aliased email address is generated by a remote messaging system.

11. The method of claim 1, wherein the set of parameters includes a geographic restriction.

12. The method of claim 11, wherein the geographic restriction is based on at least one of a location of the other computing device or a location where capture of the machine-readable code occurred.

13. The method of claim 1, wherein the set of parameters is selectable by the user.

14. A system, comprising:

one or more processors implementing a communication alias module that is configured to generate an aliased email address that is associated with an actual email address of a user but is uncorrelated from the actual email address;

the one or more processors further implementing a machine-readable code module configured to generate a machine-readable code corresponding to the aliased email address and a set of profile information associated with the user, the machine-readable code configured for display by a client computing device associated with the user and configured for capture by another computer device associated with another person;

wherein capture of the machine-readable code by the other computing device either:

enables an email template to be presented to the other person on the other computing device, the email template being prepopulated with at least the aliased email address and at least a portion of the set of profile information; or enables a web link to be presented to the other person on the other computing device, the web link being prepopulated with at least the portion of the set of profile information;

wherein the portion of the set of profile information is determined based on a set of parameters, and wherein determination of the portion of the set of profile information includes enabling or disabling one or more elements of the set of profile information based on the set of parameters.

15. The system of claim 14, wherein the machine-readable code is generated in response to generating the aliased email address.

16. The system of claim 14, wherein the aliased email address is generated in response to a user request so that the machine-readable code can be captured by the other computing device.

17. The system of claim 14, wherein the machine-readable code is a quick-response (QR) code configured to be captured by an imaging element of the other computing device.

18. The system of claim 14, wherein the set of profile information includes at least one of a contact card, messaging options, or cryptographic key information.

19. The system of claim 14, wherein the client computing device is the system.

20. The system of claim 14, wherein the system is a remote messaging system.

21. A method, comprising:

generating, by one or more processors, an aliased email address that is associated with an actual email address of a user but is uncorrelated from the actual email address;

generating, by the one or more processors, a machine-readable code corresponding to the aliased email address and a set of profile information associated with the user, the machine-readable code configured for display by a client computing device associated with the user and configured for capture by another computer device associated with another person;

wherein capture of the machine-readable code by the other computing device either:

enables an email template to be presented to the other person on the other computing device, the email template being prepopulated with at least the aliased email address and at least a portion of the set of profile information; or enables a web link to be presented to the other person on the other computing device, the web link being prepopulated with at least the portion of the set of profile information, wherein the portion of the set of profile information is determined based on a set of parameters, and wherein the set of parameters includes at least one of a temporal restriction or a geographic restriction.

* * * * *